United States Patent [19]

Unsworth et al.

[11] 3,928,230

[45] Dec. 23, 1975

[54] ENCAPSULATION OF FLUIDS AND SOLIDS

[75] Inventors: William Unsworth, Manchester; Graham Harry Helsby, Egerton, both of England

[73] Assignee: Magnesium Elektron Limited, Manchester, England

[22] Filed: May 22, 1973

[21] Appl. No.: 362,794

Related U.S. Application Data

[63] Continuation-in-part of Ser. No. 170,658, Aug. 10, 1971, abandoned.

[30] Foreign Application Priority Data

Aug. 13, 1970 United Kingdom............... 39075/70

[52] U.S. Cl. ...................... 252/316; 8/79; 252/182; 264/4; 424/32; 427/216; 427/222
[51] Int. Cl.² .......................................... B01J 13/02
[58] Field of Search .... 252/316; 117/100 C, 100 M, 117/161 ZB; 424/32; 264/4; 427/222

[56] References Cited

UNITED STATES PATENTS

| | | | |
|---|---|---|---|
| 3,006,877 | 10/1961 | Herzberg | 260/24 |
| 3,055,433 | 9/1962 | Hiltpold et al. | 424/32 |
| 3,268,468 | 8/1966 | Barnstorff et al. | 117/161 ZB X |
| 3,415,758 | 12/1968 | Powell et al. | 252/316 |
| 3,432,327 | 3/1969 | Kan et al. | 252/316 X |
| 3,544,517 | 12/1970 | Muzyczko et al. | 117/161 ZB X |

*Primary Examiner*—Richard D. Lovering
*Attorney, Agent, or Firm*—Karl W. Flocks

[57] ABSTRACT

The present invention relates to the microencapsulation, capsule diameter 1 to 500 micron, of fluids and solids and is particularly suitable for the formation of capsules having walls of epoxy and like polymers which, as is known, are inert to most chemicals, are not soluble in or permeable to a wide range of fluids and have high static and flexural strength characteristics.

26 Claims, No Drawings

ENCAPSULATION OF FLUIDS AND SOLIDS

BACKGROUND OF THE INVENTION

This application is a continuation-in-part of U.S. Pat. application Ser. No. 170,658 filed Aug. 10th, 1971, now abandoned.

It is known to encapsulate fluids, that is gases and liquids, and solids in an enveloping skin of organic and/or inorganic material. The capsules may range widely in size from 50 microns or less to several millimetres depending on the purpose for which they are to contain. The substances contained by the capsules may also vary widely, for example, they may be dyes, inks, pharmaceuticals, chemical reagents or any other material that is required to be preserved until the capsule is broken, melted, dissolved or otherwise removed. The material forming the capsule should be inert to the substance it is to contain and possess sufficient strength to permit normal handling while being thin walled to give a high core volume to wall volume ratio. Many organic materials which appear to have most if not all the desired capsule-forming properties are not suitable for encapsulating substances because they are not susceptible to current encapsulating techniques.

In one known encapsulating technique a polymerisable monomer is dissolved in the liquid to be encapsulated. The resulting solution is dispersed in an immiscible polar liquid which is a solvent for the appropriate polymerising agent. On addition of the polymerising agent to the polar liquid a wall of polymer is formed at the interface of the two immiscible liquids thus encapsulating the core liquid.

In another technique a polymer and a liquid are selected such that the polymer is soluble in the liquid at an elevated temperature but not at ambient temperature. A solution of the polymer at an elevated temperature is prepared and the substance to be encapsulated, which must be insoluble in both the polymer and solvent liquid, is dispersed in the solution. The solution is allowed to cool when the polymer condenses on the particles of core substance and encapsulates them.

In a further technique a polymer is dissolved in a suitable solvent and the substance to be encapsulated, which must be immiscible with the solution, is dispersed in the solution. A second liquid which is miscible with the solvent but which does not dissolve the polymer or core substance is added to the solution to cause precipitation of the polymer which condenses on the particles of core substance.

SUMMARY OF INVENTION

According to the present invention a process for the encapsulation of fluids and solids comprises dissolving a water insoluble polymerisable epoxy monomer in a solvent having a higher affinity for water than for the monomer, dispersing the monomer solution in water, dispersing the aqueous dispersion the substance to be encapsulated, mixing into the resulting dispersion a solution of a polymerising agent effective to polymerise said epoxy monomer in a solvent having a higher affinity for water than the polymerising agent and continuing the mixing until polymerisation of the monomer is substantially complete.

In a modification of the process of the immediately preceding paragraph, the process comprises dispersing in water the substance to be encapsulated, dissolving a water insoluble polymerisable epoxy monomer in a solvent having a higher affinity for water than the monomer, dispersing the monomer solution in the aqueous dispersion of the substance, mixing with the resulting dispersion of monomer and substance a solution of a polymerising agent effective to polymerise said epoxy monomer in a solvent having a higher affinity for water than for the polymerising agent and continuing the mixing until polymerisation of the monomer is complete.

In the modified process it is possible to add the monomer and its polymerising agent together to the dispersion of the substance to be encapsulated.

If desired, the water may include gelatin, methyl cellulose, acacia or other suspending agents which will assist in maintaining the required degree of dispersion.

One or more suspending agents may be introduced into the aqueous monomer dispersion with the substance to be encapsulated.

Preferably, after the substance to be encapsulated has been added to and dispersed in the aqueous monomer dispersion, the resulting dispersion is allowed to stabilise before the polymerising agent is gradually added. It will be appreciated that if the substance to be encapsulated is a fluid the size of the particles, and hence the core size of the resulting capsules, may be varied between wide limits by appropriately varying the rate of agitation of the mix containing the substance to be encapsulated. However, when the substance to be encapsulated is a solid the core size of the capsules will also depend upon the particle size of the solid.

The present process is particularly suitable for encapsulating substances using epoxy monomers to form epoxy polymer capsules. The epoxy monomer selected for use in the process may be one of the many epoxy monomers available having regard to the many epoxy monomers available having regard to the properties required of the resulting polymer capsule and also the substance to be encapsulated since the latter must not react with the monomer or the resulting polymer.

Suitable hydrophilic solvents for epoxy monomers, which may be used in admixture, include acetone, diethylene glycol, dioxan, tetrahydrofuran and low molecular weight aliphatic alcohols such as methyl, ethyl, propyl and diacetone alcohol.

The same or different solvent or solvent mixture may be used for the polymerising agent which is selected to be effective in the presence of water. Polyamides and polyamides are well known as polymerising agents for epoxy monomers. Examples of polyamines which may be used in the present process include m - phenylene diamine, triethylene tetramine, 4,4'-diaminodiphenyl sulphone, ethylene diamine, diethylaminopropylamine and 4,4'-diaminodiphenylmethane.

If it is desired or required that the polymerising agent be relatively water insoluble or water immiscible then an adduct of polyamine and phenol-formaldehyde may be used. Polyamine phenol-formaldehyde adducts are relatively immiscible with water and are effective polymerising agents of epoxy monomers in the presence of water. Examples of suitable adducts for use as polymerising agents in the present process are isophorone diamine phenol-formaldehyde adduct and trimethyl hexamethylene-diamine phenol-formaldehyde adduct, both manufactured and marketed by Scholven Chemie A.G. Other adducts which may be used are 4,4'-isopropylene diphenyl adduct and acrylonitrile/-tetramethylene pentamine.

Other nitrogen-containing polymerising agents which may be used include oxy-amines, such as ethanolamine and butanolamine; hydroxy-alkylated polyamides such as 2-aminoethyl-ethanolamine and N-hydroxyproply-m-phenylene diamine; cyanamide and polymerisation products, such as dioyanamide; amides such as acetamide and adipamide, and polyamide resins such as those sold under the Versamid trade marks.

Polymersing agents which do not contain nitrogen may also be used. These agents include alcoholates of polyvalent metals, such as aluminum butylate and ferric butylate; organic and inorganic acids and anhydrides, such as succinic acid, dodecylsuccinic acid, phthalic anhydride, pyromellitic anhydride, methyl endomethylene tetrahydrophthalic anhydride, terephthalic acid, and benzenesulphonic acid; metal-containing organic and inorganic compounds such as zinc fluoborate and potassium perchlorate; and boron trifluoride complexes such as diethylaniline — boron trifluoride complex.

Polymerisation may be accelerated, if desired, by heating or by the addition of conventional accelerating agents.

Epoxy resins have advantages over other organic materials as wall-forming materials for capsules. They are inert to most chemicals and are not soluble in or permeable to a wide range of fluids. Thus capsules of epoxy resins are suitable for containing many volatile substances since the walls prevent or at least considerably reduce the loss of the encapsulated substance. Further, the epoxy resin walls prevent or at least reduce water and other fluids permeating into the capsules and contaminating the encapsulated material. As is known epoxy polymers have high static and flexural strength characteristics and this enables relatively thin-walled capsules to be used thus giving a high core volume to wall volume ratio. Moreover, the characteristics of epoxy polymers can be modified, e.g. by the addition of extenders, plasticisers or accelerators, to provide capsules having wall characteristics to meet a variety of requirements. Combustion of capsules of epoxy resins does not leave any wall material residue since epoxy resins do not contain any metallic or inorganic constituents.

DESCRIPTION OF PREFERRED EMBODIMENTS

So that the invention may be clearly understood the following examples are given of the manner in which the process may be carried into effect.

EXAMPLE 1

Encapsulation of Xylene 0.5% by weight of gelatin was dissolved in 1 litre of water and 5g of Epikote 828, an epoxy resin monomer manufactured by Shell Chemical Company, dissolved in 15 ml acetone was dispersed in the gelatin solution by stirring. 20 ml xylene was then added to the aqueous dispersion which was continuously agitated for 10 minutes to disperse the xylene and produce suspended droplets of the required size for encapsulation. A solution of 4g of isophorone diamine phenol-formaldehyde adduct dissolved in 15 ml of acetone was added to the aqueous dispersion at the rate of 3 ml per minute. The resulting mixture was continuously stirred for one hour then heated gradually to 50°C and held at that temperature for 3 – 4 hours while maintaining the stirring action.

After separating and drying by a conventional method, capsules containing xylene and ranging from 50 – 100 microns in diameter were obtained.

EXAMPLE 2

Encapsulation of a polyester resin 0.5% by weight of methyl cellulose were dissolved in 1 litre of water and 1g of Epikote 828 dissolved in 15 ml of acetone was dispersed in the cellulose solution by stirring. 4g of a polyester resin dissolved in a mixture of 5 ml xylene and 10 ml acetone was added to the aqueous dispersion which was agitated continuously for 10 minutes. A solution of 1g isophorone diamine phenol-formaldehyde adduct was added to the aqueous dispersion at the rate of 2 – 4 ml per minute. Stirring was continued and after one hour the temperature of the mix was raised gradually to 50°C and maintained at that temperature for two hours.

After separation and drying a high yield of capsules ranging from 20 – 50 microns in diameter were obtained. On crushing a quantity of the capsules moisture was observed showing that they contained the polyester resin.

EXAMPLE 3

Encapsulation of a metal powder

An aqeuous dispersion containing 5g of Epikote 828 was prepared as described in Example 1. 1g of magnesium powder having a particle size of 100 micron was added slowly to the dispersion with continuous stirring and then 4g of isophorone diamine phenol-formaldehyde adduct dissolved in 20 ml acetone was added at the rate of 2 ml per minute. After stirring for one hour the temperature of the mix was gradually raised to 50°C and the mix maintained at that temperature for four hours with continuous stirring.

Capsules containing magnesium particles were obtained.

EXAMPLE 4

Encapsulation of a polyester jointing compound

A solution of 5g acacia in 500 ml of water was prepared and to this solution was added 4g of a polyester jointing compound (JC 5A manufactured by Titanine Limited) dispersed in 20 ml of acetone and 5 ml of xylene. This dispersion was agitated for 10 minutes to disperse the jointing compound and produced suspended spherical droplets of the size required for encapsulation. At the end of 10 minutes a solution of an epoxy resin (Araldite PZ 985) and an epoxy resin polymerising agent (Araldite HZ 985), both manufactured by Ciba-Geigy (U.K.) Limited, in 10 ml diacetone alcohol was slowly added to the dispersion. The resulting dispersion was agitated for 30 minutes before its temperature was raised to about 60°C, at which temperature it was maintained for about 90 minutes while still being agitated. After this time the liquid phase was decanted off, the capsules were washed with water and were allowed to dry in air.

The capsules obtained ranged in diameter from 5 to 100 microns.

It will be appreciated that when a fluid is being encapsulated, as in Examples 1, 2 and 4, the capsule size will depend upon the degree and vigour of the agitation during encapsulation. Thus, it is possible by the present process or its modification to produce fluid-filled capsules ranging in diameter from 1 to 500 microns. When a solid is being encapsulated, as in Example 4, the diameters of the capsules will, of course, depend on the size of the solid particles being encapsulated.

The substance to be encapsulated may itself be dispersed in an inert carrier liquid, e.g. water or dissolved in or diluted by a suitable non-aqueous solvent, e.g. xylene.

In our co-pending British Pat. Applications Nos: 39076/70 and 39077/70 are described and claimed other processes for encapsulating fluid and solid substances, these processes also being applicable to the use of epoxy resins as capsule forming material.

We claim:

1. A process for the encapsulation of fluids and solids comprising:
   dissolving a water insoluble polymerisable epoxy monomer in a solvent having a higher affinity for water than for the monomer;
   dispersing the monomer solution in water;
   dispersing in the aqueous dispersion the substance to be encapsulated;
   mixing into the resulting disperson a solution of a polymerising agent effective to polymerise said epoxy monomer in the presence of water, said polymerising agent being in a solvent having a higher affinity for water than the polymerising agent; and
   continuing the mixing until polymerisation of the monomer is substantially complete.

2. A process according to claim 1, in which after the substance to be encapsulated has been added to and dispersed in the aqueous monomer solution, the resulting dispersion is allowed to stabilise before the polymerising agent is gradually added.

3. A process according to claim 1, in which the water contains a suspending agent which will assist in maintaining the required degree of dispersion.

4. A process according to claim 3, in which the suspending agent is selected from the group consisting of gelatin, methyl cellulose and acacia.

5. A process according to claim 1, in which the solvent having a higher affinity for water than the monomer consists of at least one of the solvents selected from the group consisting of acetone, diethylene glycol, dioxan, tetrahydrofuran and low molecular weight aliphatic alcohols.

6. A process according to claim 1, in which the polymerising agent is selected from the group consisting of a polyamine and a polyamide.

7. A process according to claim 6, in which the polymerising agent is selected from the group consisting of dicyandiamide, triethylenetetramine, a diethylaminopropylamine and 4,4'-diaminodiphenylmethane.

8. A process according to claim 1, in which the polymerising agent is an adduct of a polyamine and phenolformaldehyde.

9. A process according to claim 8, in which the adduct is selected from the group consisting of isophorone diamine phenol-formaldehyde and trimethyl hexamethylene diamine phenol-formaldehyde.

10. A process according to claim 1, in which the solvent for the polymerising agent consists of at least one of the solvents selected from the group consisting of acetone, diethylene glycol, dioxan, tetrahydrofuran and a low molecular weight aliphatic alcohol.

11. A process for the encapsulation of fluids and solids comprising:
    dispersing in water the substance to be encapsulated;
    dissolving a water insoluble polymerisable epoxy monomer in a solvent having a higher affinity for water than the monomer;
    dispersing the monomer solution in the aqueous dispersion of the substance;
    mixing with the resulting dispersion of monomer and substance a solution of a polymerising agent effective to polymerise said epoxy monomer in the presence of water, said polymerising agent being in a solvent having a higher affinity for water than for the polymerising agent; and
    continuing the mixing until polymerisation of the monomer is complete.

12. A process according to claim 11, in which after the substance to be encapsulated has been added to and dispersed in the aqueous monomer solution, the resulting dispersion is allowed to stabilise before the polymerising agent is gradually added.

13. A process according to claim 11, in which the water contains a suspendidng agent which will assist in maintaining the required degree of dispersion.

14. A process according to claim 13, in which the suspending agent is selected from the group consisting of gelatin, methyl cellulose and acacia.

15. A process according to claim 11, in which the solvent having a higher affinity for water than the monomer consists of at least one of the solvents selected from the group consisting of acetone, diethylene glycol, dioxan, tetrahydrofuran and low molecular weight aliphatic alcohols.

16. A process according to claim 11, in which the polymerising agent is selected from the group consisting of a polyamine and a polyamide.

17. A process according to claim 11, in which the polymerising agent is selected from the group consisting of dicyandiamide, triethylenetetramine, a diethylaminopropylamine and 4,4'-diaminodiphenylmethane.

18. A process according to claim 11, in which the polymerising agent is an adduct of a polyamine and phenol-formaldehyde.

19. A process according to claim 18, in which the adduct is selected from the group consisting of isophorone diamine phenol-formaldehyde and trimethyl hexamethylene diamine phenol-formaldehyde.

20. A process according to claim 11, in which the solvent for the polymerising agent consists of at least one of the solvents selected from the group consisting of acetone, diethylene glycol, dioxan, tetrahydrofuran and a low molecular weight aliphatic alcohol.

21. A process for producing capsules having walls of epoxy material and containing a fluid or solid, which comprises dissolving an epoxy monomer in a solvent having a higher affinity for water than the monomer, dispersing the monomer solution in water, dispersing in the aqueous solution a fluid or solid, mixing with the resulting dispersion a solution of a polymerising agent selected from the group consisting of polyamines, polyamides and adducts of polyamines and phenolformaldehyde in a solvent having a higher affinity for water than the polymerising agent, and continuing the mixing until polymerisation of the monomer is substantially complete.

22. A process according to claim 21, in which the particle size of the dispersed fluid or solid is such that the epoxy polymer walled capsules obtained have diameters from 1 to 500 microns.

23. A process for the encapsulation of fluids and solids comprising dispersing in water the substance to be encapsulated, dissolving an epoxy monomer in a solvent having a higher affinity for water than the monomer, dispersing the monomer solution in the aqueous dispersion of the substance, mixing with the resulting dispersion of monomer and substance a solution of a polymerising agent selected from the group consisting of polyamines, polyamides and polyamine phenolformaldehyde adducts in a solvent having a higher affinity for water than for the polymerising agent, and continuing the mixing until polymerisation of the monomer is complete.

24. The process according to claim 23, in which the particle size of the dispersed fluid or solid is such that the epoxy polymer walled capsules obtained have diameters from 1 to 500 microns.

25. A process for the encapsulation of fluids and solids comprising:
dissolving a water insoluble polymerisable epoxy monomer in a solvent having a high affinity for water than for the monomer;
dispersing the monomer solution in water;
dispersing in the aqueous dispersion the substance to be encapsulated and simultaneously mixing into the dispersion a solution of a polymerising agent effective to polymerise said epoxy monomer in the presence of water, said polymerising agent being in a solvent having a higher affinity for water than the polymerising agent; and
continuing the mixing until polymerisation of the monomer is substantially complete.

26. A process for the encapsulation of fluids and solids comprising:
dispersing in water the substance to be encapsulated;
dissolving a water insoluble polymerisable epoxy monomer in a solvent having a higher affinity for water than the monomer;
dispersing the monomer solution in the aqueous dispersion of the substance and simultaneously mixing with the dispersion a solution of a polymerising agent effective to polymerise said epoxy in the presence of water, said polymerising agent being in a solvent having a higher affinity for water than for the polymerising agent; and
continuing the mixing until polymerisation of the monomer is complete.

* * * * *